(12) United States Patent
Laurence

(10) Patent No.: US 10,310,765 B1
(45) Date of Patent: Jun. 4, 2019

(54) RECORD-ORIENTED DATA STORAGE FOR A DISTRIBUTED STORAGE SYSTEM

(71) Applicant: Amazon Technologies, Inc., Seattle, WA (US)

(72) Inventor: Douglas Stewart Laurence, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 15/692,488

(22) Filed: Aug. 31, 2017

(51) Int. Cl.
*G06F 3/06* (2006.01)

(52) U.S. Cl.
CPC .............. *G06F 3/064* (2013.01); *G06F 3/067* (2013.01); *G06F 3/0608* (2013.01)

(58) Field of Classification Search
CPC ......... G06F 3/064; G06F 3/0608; G06F 3/067
See application file for complete search history.

(56) References Cited

U.S. PATENT DOCUMENTS

| | | | | |
|---|---|---|---|---|
| 5,524,201 A * | 6/1996 | Shwarts | ............ | G06F 17/30017 707/E17.009 |
| 2011/0099326 A1* | 4/2011 | Jung | ................... | G06F 12/0246 711/103 |
| 2012/0059800 A1* | 3/2012 | Guo | .................... | G06F 11/1448 707/664 |
| 2014/0172795 A1* | 6/2014 | Teng | ....................... | H03M 7/30 707/634 |

* cited by examiner

*Primary Examiner* — Mano Padmanabhan
*Assistant Examiner* — Andrew J Cheong
(74) *Attorney, Agent, or Firm* — Davis Wright Tremaine LLP; Scott Adams

(57) ABSTRACT

Techniques for storing data on distributed data storage system are disclosed herein. A plurality of data shards are generated from data provided in association with a request to store the data. A first data shard having is generated from a first portion of the data and a second data shard is generated from a second portion of the data. An initial portion of the second data shard is appended or concatenated to the first data shard to generate an augmented first data shard. The augmented first data shard is stored on one or more storage nodes. The first and second data shards comprise a plurality of data records separated by record delimiters. Each data shard may filter record data contained thereon without coordination with other data shards based on positions of the record delimiters.

20 Claims, 11 Drawing Sheets

RECORD-ORIENTED DATA STORAGE FOR A DISTRIBUTED STORAGE SYSTEM

BACKGROUND

Data storage is becoming increasingly difficult due to the size and complexity of data. In some data storage systems, data may be stored in such a way that an individual data record is divided and stored on a set of data storage volumes. Accordingly, when a user attempts to retrieve the data record, separate data volumes that contain the respective pieces of the divided data record must coordinate to obtain the divided pieces. Moreover, the divided pieces must be concatenated or stitched together to complete the data record and thereby make the data useable. This process increases latency and the number of network and/or disk operations required to fulfill a data retrieval request.

BRIEF DESCRIPTION OF THE DRAWINGS

Various techniques will be described with reference to the drawings, in which:

FIG. 10 illustrates an illustrative example of a process for and

DETAILED DESCRIPTION

Figure 1:
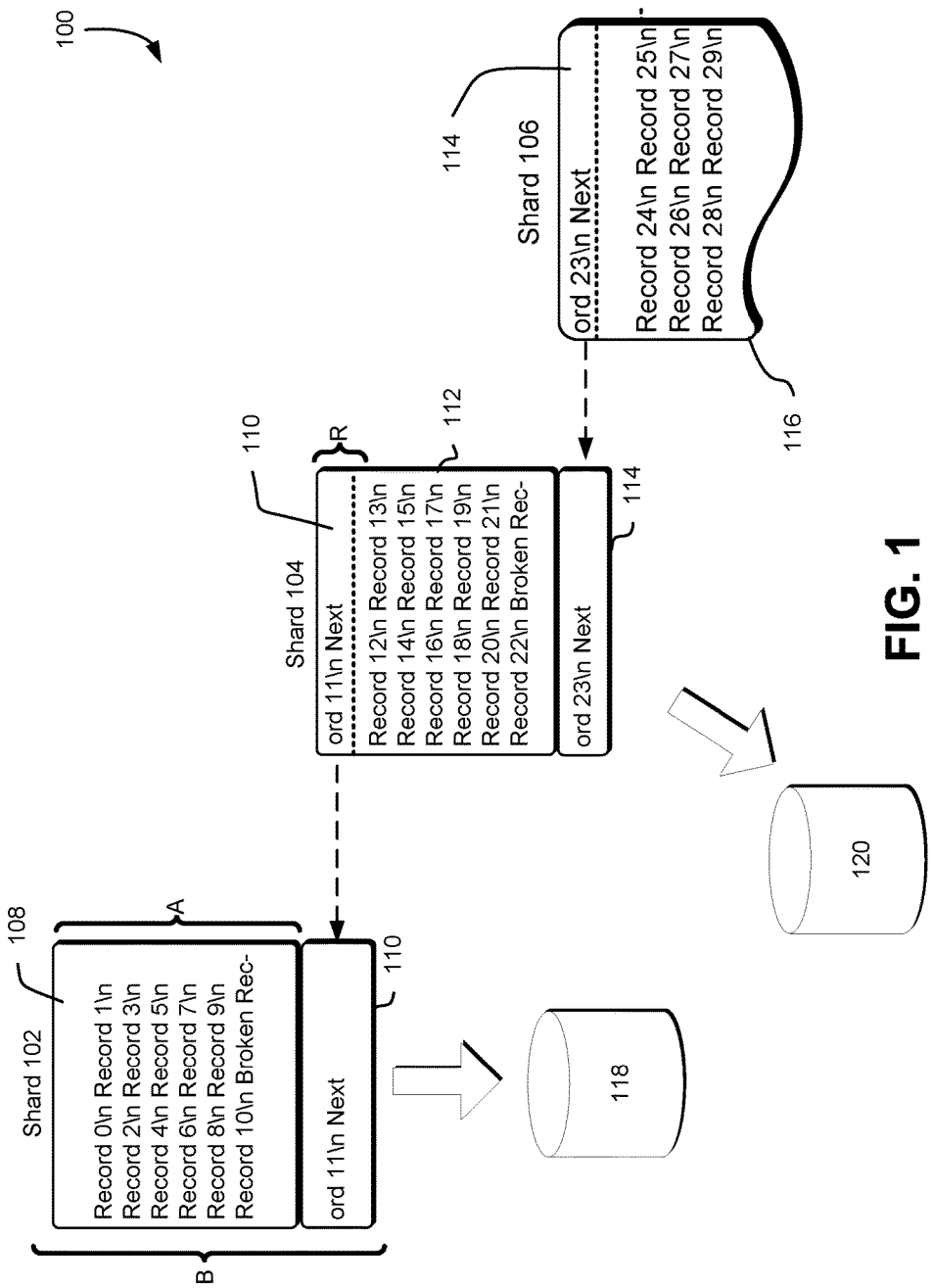
FIG. 1 shows an illustrative example of an environment in which various embodiments may be implemented.

Techniques described and suggested herein include methods, systems, and processes for storing original data on data storage systems. Techniques described and suggested further include processing data received in association with a request to store the data. The data is processed to generate original data shards storing the data in a similar format to which the data was received, and from which the original data may be read without performing logical operations involving a plurality of shards (e.g. XOR operations). The term "original data shards" as used herein may also be referred to as "data shards" or "data blocks". The methods and techniques described herein may be applied to a data processing and storage service of a computing resource service provider to increase the efficiency and availability of the data stored, and to reduce the latency and processing required for retrieving or filtering the stored data.

Data, which may also be referred to herein as "a stream of data" or "data objects," may be received from customers of a computing resource service provider for storage using a storage service. Data may also be received from other services provided by the computing resource service provider including, but not limited to redundant storage services, virtual machine services, web hosting services, and other such services. The data may be received in association with one or more operations performed by the other service.

As used herein, the term "shard" may be used to refer to the data storage abstraction of a shard (i.e., the logical storage device), the associated data storage node of the shard (i.e., the physical storage device), and/or an associated data storage for the shard. The shards may be stored using a collection of data storage nodes including, but not limited to, tape drives, tapes, disk drives (including both solid state drives and spinning drives), removable media, computer memory, flash drives, various magnetic media, and/or other such storage devices. Each data shard may be stored on one or more data storage nodes of a collection of data storage nodes, including both homogenous and heterogeneous collections of data storage nodes such as, for example, sets of tape drives, sets of disk drives, or sets containing both tape drives and disk drives. Each of the data storage nodes may comprise one or more data storage volumes accessible to store and retrieve data. Data may be stored according to an appropriate file system. A data storage volume, as described herein, is a structure that stores data and can be independently and arbitrarily defined and/or addressed from or by a physical device storing and accessing the data (e.g., memory), or by a virtual machine operating remotely from a user. The data storage volume may be stored on a single storage device, or may be stored on a plurality of data storage devices (e.g., memory, hard disk drives, optical drives) organized into a data storage structure. The volume may comprise a single contiguous section of data storage or memory in a single storage device, or may comprise a plurality of sections of data storage organized to store a contiguous section of data.

One or more data bundles may be generated from the data received. The data bundles may include one or more of the original data shards and one or more parity shards. The parity shards may be generated according to a redundancy encoding scheme. Data that is unavailable or unable to be located on the original data shards may be reconstructed using the parity shards, as described below. The original data shards may be sequentially generated in correspondence with the sequential ordering of the data received. The original data shards may have a predetermined size defined by a requestor or by another entity, such as a system administrator. Some storage systems may implement data shards having a size on the order of kilobytes; however, the data storage systems and methods described herein may involve generating original data shards having a larger size—on the order of megabytes or greater. The original data shards may comprise a sequence of data records formatted in accordance with a data type. Sequential or adjacent data records of the data received may be separated by a record delimiter that indicates a boundary between separate or independent regions of the data. A maximum record size may be associated with the data records received specified by or in association with the request to process data. Instead of being separated by delimiters, individual records in the sequence of data records may have a predetermined size or length that may be provided to the processing service in association with the request to process data.

An initial portion of each original data shard subsequent to a first original data shard is duplicated and appended or concatenated to the preceding data shard to generate an augmented or appended data shard. The augmented data shard may then be stored in one or more storage nodes. The service provider may, in response to receiving a request specifying data to be retrieved, search for data in the augmented data shards stored in the storage nodes. The storage nodes may be tasked with searching for the requested data by sequentially parsing the data records contained thereon. The storage node may search the entire first data shard for the requested data and return a positive indication if the requested data is located. The storage node may then search subsequent data shards for the requested data. However, the first data record of each subsequent data shard to the first data shard may be disregarded or ignored during searching. This is at least because the preceding data shard to the current shard contains the entire last record completed by appending the initial portion. According to this method and system, coordination between adjacent data shards to locate requested data is unnecessary because appending the initial portion of one shard to an end of the preceding shard eliminates broken or divided data records.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is an illustrative example of an environment 100 in which various embodiments of the present disclosure may be implemented. The environment 100 comprises a plurality of augmented data shards including a first augmented data shard 102, a second augmented data shard 104, and a third augmented data shard 106 corresponding respectively to a first data shard 108, a second data shard 112, and a third data shard 116. Each of the data shards contain a plurality of data records generated or encoded from corresponding data records in the original data received in association with a request to store data. The plurality of records is sequentially written in the shards and each of the records terminates at a record delimiter. The record delimiter in this embodiment is indicated by a new line character '\n'; however, any delimiter appropriate for the data type may be used. As described above, individual records in the plurality of records may be of a predetermined size or length instead of being separated by a delimiter.

An initial portion of each data shard, except for the first data shard 108, is appended to the end of the preceding data shard. In particular, an initial portion 110 of a second data shard 112 is duplicated and appended to the preceding first data shard 108 to generate the first augmented shard 102, an initial portion 114 of a third data shard 116 is duplicated and appended to the preceding second data shard 112 to generate the second augmented shard 104, and so forth. The first data shard 108, the second data shard 112, and the third data shard 116 each have a predetermined size A. The augmented first shard 102, the augmented second shard 104, and the augmented third shard 106 each have a predetermined size B larger than the predetermined size A. The size of the initial portions of each shard appended to the previous shard may be a predetermined size R smaller than the predetermined size A or the predetermined size B. In one embodiment, the predetermined size R may be 10% or less than the predetermined size A of the shards. For example, the predetermined size A may be 2 megabytes and the predetermined size R of the initial portion may be 4 kilobytes (i.e., R is 2% of A). In one embodiment, the predetermined size R of the initial portions may be specified by the requestor—for example, in association with the request to store data. In one embodiment, the predetermined size R may be specified by an entity having administrative rights to define the size R, such as a system administrator or developer. The predetermined size R may correspond to a maximum record length contained in the data received. The predetermined sizes A, B, and R may each be adjusted or adapted based on performance, utilization, or other parameters related to the operation of the implementing system.

Each record is sequentially written to the shards until the predetermined size A of the shards is reached. For instance, Record 0 through Record 10 and a portion of (Broken) Record 11 are written to the first shard 108. Record 11, however, is broken or divided between the first shard 108 and the second shard 112 such that a first portion of Record 11 is on the first shard 108 and an end portion of the Record 11 is on the second shard 112. The second portion of the Record 11 is written on the second shard 112 followed sequentially by the Next Record 12. The initial portion 110 of the second shard 112, including the end portion of Record 11, is duplicated and appended to the end of the first shard 108 to generate the augmented first shard 102. The Next Record 12 is contained in its entirety on the second shard 112. Records 13 through Record 22 in their entirety are written to the second shard 112 until Record 23, which is broken or divided between the second shard 112 and the third shard 111. Record 23 is contained in its entirety on augmented data shard 104 after the initial portion 114 of the third shard 111 is appended to the second shard 112 to generate the augmented second shard 104.

Processing the sequential records from the data using a data duplication and appending approach enables the corresponding storage node storing the augmented data shard to locate an entire record located thereon without coordination between storage nodes or a management entity for managing the storage nodes. Each storage node storing the augmented data shards are responsible for searching data records up to the last record delimiter written in the shard of the first storage node. Each storage node, with the exception of a first storage node 118 storing the first augmented shard 102, is responsible for searching data beginning after the first record delimiter stored in the shard. The storage node storing the first augmented shard 102 is responsible for searching records up to and succeeding the first record delimiter.

As an illustrative example, in response to receiving a query to search for Record 11, the storage node 118 would successfully locate the queried data in its entirety because the end portion of Record 11 is contained in the initial portion 110 appended to generate the first augmented shard 102. By contrast, the same storage node 118, in response to a query to search for Record 12, would skip past the first record delimiter and therefore not locate any portion of Record 12 even though a portion of Record 12 is technically stored in the second shard 112. The second augmented shard 104 is responsible for both portions of the Record 12 and would therefore locate the Record 12 in its entirety in response to receiving a query to locate data corresponding to the Record 12. Because every record is fully contained on a single storage node, each storage node may act in an autonomous manner to search for queried record data without the need to coordinate with other storage nodes to locate the queried data. This approach increases the efficiency of data retrieval, reduces latency, and reduces the processing cycles required to find data. Although processing the records is described with respect to delimiters, records may be parsed according to the predetermined size or length of a record instead. For instance, the requestor may specify a maximum length for records received in the data. As the data is processed, the processing service may insert a delimiter at the end each amount or length of data corresponding to the maximum record length.

The environment 100 can by implemented by any organization, catalogue, or system related to data storage and retrieval. For example, the environment 100 may be implemented by a computing system searching local files such as a hard disk drive (e.g., disc drive, optical drive, solid-state drive), which may be appropriately formatted according to a file system (e.g., NTFS, Raid, FAT). In one embodiment, the environment 100 may be implemented by a data archive system comprising a collection of computing resources that collectively operate to provide storage for data archiving and backup of customer data. The data in such a data archive may comprise one or more data files that may be combined to form an archive. The archival storage service may be configured to persistently store data that may be infrequently accessed and for which long retrieval times are acceptable to a customer utilizing the archival storage services. In one embodiment, the environment 100 may be implemented by a distributed storage system comprising a set of datacenters located in one or more geographic regions to promote, inter alia, fast and efficient access to data by customers and system entities located in or near the one or more geographic regions. Those of ordinary skill in the art will appreciate that these embodiments are non-limiting and illustrative of the myriad data storage and retrieval systems in which the techniques disclosed herein may be implemented.

Figure 2:
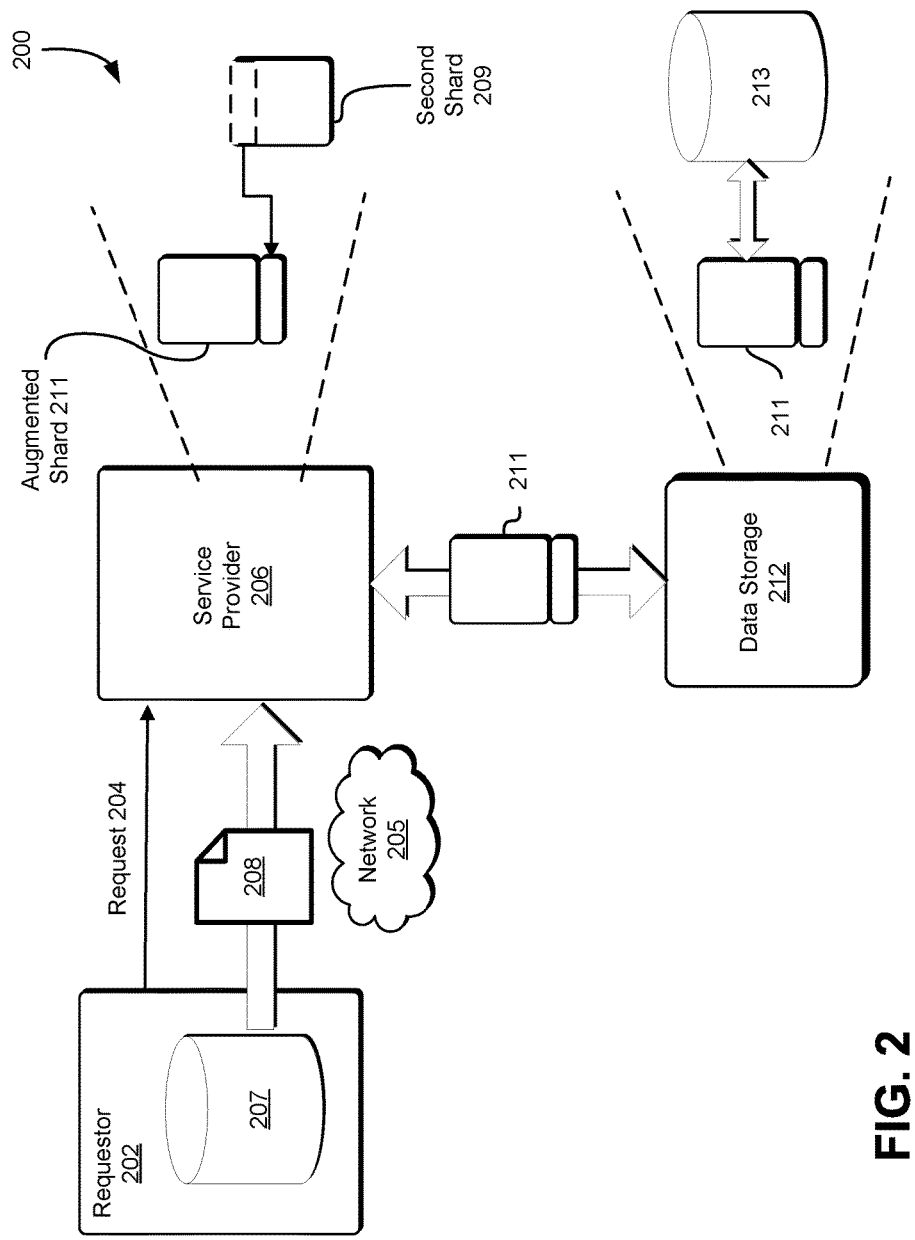
FIG. 2 shows a second illustrative example of an environment in which various embodiments may be implemented.

FIG. 2 is an illustrative example of an environment 200 in which various embodiments of the present disclosure may be practiced. In an embodiment, a data storage operation is performed to store data onto data storage in the environment 200. A requestor 202 may transmit a request 204, over a network 205 via a computing device (e.g., personal computer, laptop, smartphone, tablet computer), to a computing resource service provider 206 to store data. The requestor 202 may be a user that subscribes to one or more services of the service provider 206 or may be another service or application requesting to store data in conjunction with one or more related operations (e.g., domain hosting, running a virtual machine). The request 204 may specify one or more parameters related to storing the data, such as a location for storage, size parameters related to storage, or one or more classifications, projects, or matters with which the data is to be associated. Prior to fulfillment of the request 204, the service provider 206 may communicate with one or more services to authenticate the requestor 202 and/or determine whether the requestor 202 has sufficient privileges to store data. The request 204 may be submitted according to predetermined format or protocol, such as via an API call (e.g., HTTP, Javascript) or a web service request.

Upon determining that the fulfillment of the request 204 is appropriate, the service provider 206 may obtain and process data 208. In an embodiment, the data 208 may be in the form of a stream of data provided by the requestor 202 or a third-party associated with the requestor 202. In one embodiment, the data 208 may be stored in data storage 207 and provided to the service provider 206 as one or more data objects (e.g. files). The format of the data 208 provided is not particularly limited and may be formatted according to one or more predetermined file formats, such as text documents (e.g., doc, docx, rtf), media files (e.g., mp3, jpeg, gif, mpeg), web page documents (e.g., HTML, HTTP, URL), compressed data (e.g., zip, rar, iso), log data, or as raw data (e.g., binary, hexadecimal, string). A data storage service of the service provider 206 may process the data 208 according to the encoding schemes described herein. Processing the data 208 may include generating, by the service provider 206, one or more data shards 209 and appending a portion of the shards 209 to another shard to form an augmented data shard 211. The service provider 206 may perform one or more storage operations to store the processed data (e.g., in the form of augmented data shard 211) in data storage 212. The data storage 212 may comprise non-volatile computer memory 213 operable to persistently store the data (e.g., ROM, flash, optical discs, magnetic tape, HDDs, shingled magnetic recordings, solid state drives) for search and/or retrieval. In one embodiment, the data storage 212 comprises a distributed storage system operable to store and retrieve data over a network, and may include a plurality of storage nodes located in one or more geographic locations, as described herein. The data storage 212 may be data storage maintained by the service provider 206 or may be a data storage entity or location specified in the request 204 that is maintained by a third-party other than the service provider 206. The features and processes described with respect to FIG. 2 are described in greater detail below.

Figure 3:
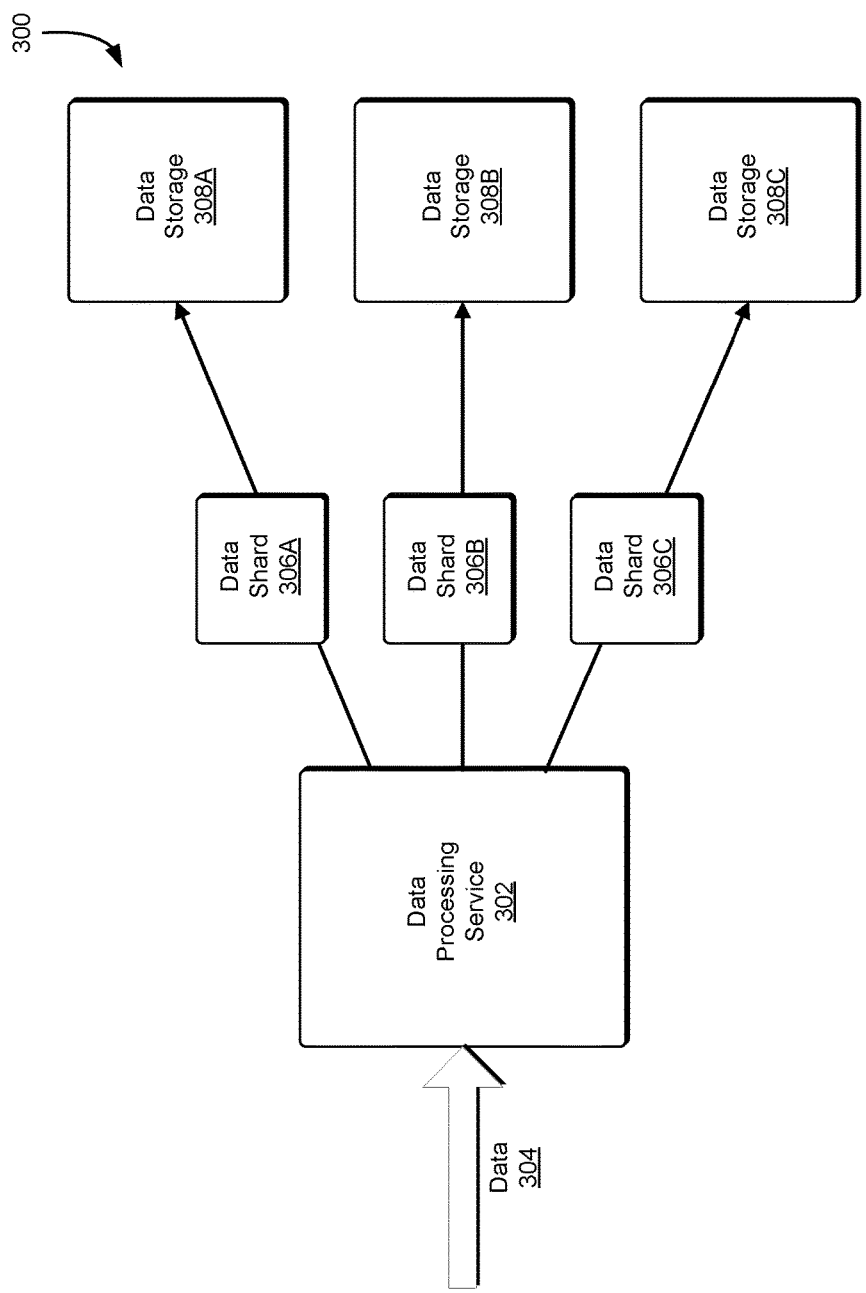
FIG. 3 shows an illustrative example of a storage operation according to various embodiments.

FIG. 3 is an illustrative example of an environment 300 in which various embodiments of the present disclosure may be practiced. In an embodiment, a data processing service 302 receives and processes data 304 provided in association with a request from a requestor, as described above. The data 304 may be in the form of a stream of data comprising a sequence of digital bits or data packets. The processing service 302 may sequentially encode the incoming data into original data shards or blocks 306 ("data shards") according to one or more data encoding schemes or techniques, as described herein. Using the encoding scheme, the incoming data 304 may be grouped into a collection of shards or blocks where each shard represents a logical distribution of data corresponding to the data 304 received. The term "data shard", as used herein, refers to data shards or blocks from which the originally received data 304 may be read or obtained without logical operations involving parity shards, as described below. Each data shard 306 may contain at least some data that is mutually exclusive to the data contained in the other data shards 306. However, some of the data shards 306 may each contain some data that is also contained in at least one other data shard 306. For example, sequential data shards 306A and 306B may have some data that is common to both shards. Further, data shard 306A may contain some data not contained in data shard 306B, and conversely data shard 306B may contain some data not contained in data shard 306A.

The processing service 302 may cause the data shards 306 to be stored in one or more of a plurality of data storage nodes or devices 308. Storage of the data shards 306 may be accomplished sequentially such that generation of each data shard 306 is completed, as described below, prior to storage in a corresponding data storage node 308. Specifically, the first data shard 306A is generated prior to being stored in data storage node 308A; however, the first data shard 306A may not be stored until at least a portion of the second data shard 306B is generated, as described below in greater detail. Although each of the shards 306 is depicted as being stored in a corresponding one of the data storage nodes 308, there is not necessarily a one-to-one correspondence between each shard and each storage node in some embodiments. In particular, more than one shard 306 may be stored on each storage node 308, the same data shard 306 may be stored on more than one storage node 308, and each storage node 308 of the distributed storage system does not necessarily contain one of the shards 306 generated. The plurality of storage devices 308 may include magnetic tape drives and/or the associated magnetic tapes, magnetic disks, optical disks, flash memory, other computer system memory, memory resistors, or other storage devices. The plurality of storage devices 308 may be located in one or more geographical locations such as, for example, one or more datacenters that are located in physically separate locations. As such, storage of the data shards 306 may involve transmission of the data shards 306 over a network from one location to another location. It should be noted that a data storage node such as the data storage nodes 308 may also be referred to herein as a "data storage location," a "data shard," a "shard," a "storage location," or a "storage device." When a data storage node 308 is referred to herein as a "data shard," it may be understood to refer to a data storage node 308 that corresponds to, or is associated with the shard as described below and may also be understood to refer to the data storage location (i.e., the location of the storage device). As an illustrative example of such usage, a data storage node that is, for example, a magnetic tape, which is located in a datacenter (the data storage location), and which is associated with data shard such as those described below, may be referred to simply as a shard or as a data shard. As used herein and in some examples and descriptions, distinctions between devices, shards, and locations will be explicitly stated unless otherwise made clear from context.

Figure 4:
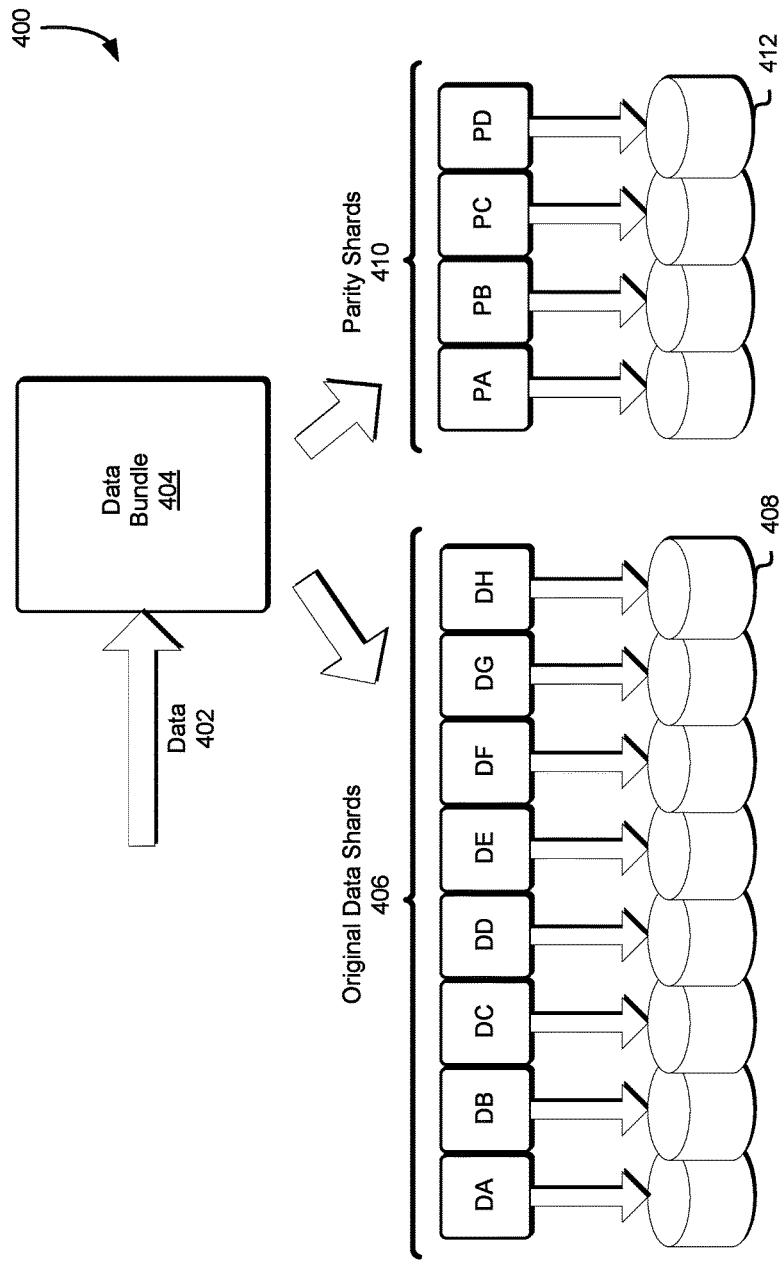
FIG. 4 shows an illustrative example of encoding a data stream according to various embodiments.

FIG. 4 is an illustrative example of an environment 400 in which various embodiments of the present disclosure may be practiced. The data 402 processed by the data processing service 302 may be stored in a plurality of original data shards 406 from which the original data may be read or obtained, as described above. The data 402 may be a contiguous volume of data having a size provided to the processing service in association with the request to process the data. The data shards 406 are generated sequentially from the first data shard "DA" to the last data shard "DH". Although eight data shards 406 are depicted in FIG. 4, the number of data shards generated may be more or less depending at least in part on the amount of data received and the size of the data shards. In some encoding schemes, the size of each data shard is on the order of kilobytes (e.g. 8 kB). The data shards 406 are produced using a "fat" data encoding scheme in which the shards produced are significantly larger—on the order of megabytes. For instance, the data shards 406 are approximately 2 megabytes in size. One or more of the original data shards 406 may be augmented data shards comprising original data shards having an initial portion of the next data shard appended thereto, as described herein. As discussed in further detail below, this enables a data duplication approach to encoding shards using an acceptable data overhead. Each of the data shards 406 are stored on one of a plurality of storage nodes 408, as described above.

The data 402 may be information encoded and stored using an encoding technique that increases the availability, redundancy, and durability of the data while minimizing the number of extra storage volume for providing a redundant storage system. In one example of a data storage system, data in data storage shard such as the third shard "DC" is not updated or altered as a result of the updated data in the first shard "DA". The two data shards (in the storage location corresponding to the first shard DA and the location corresponding to the third shard DC) may remain independent of each other in that changes to one or the other may cause updates to the derived shard of the second data shard DB, but such changes may not cause updates to the other data shards in the bundle 404 (e.g., DD through DH). The bundle 404 has parameters defined by an integer N representing the number of original data shards 406 and an integer K representing the number of parity or redundancy shards.

The processing service may index the original data shards 406 and the parity shards 410 for data retrieval and reconstruction. In one embodiment, one or more of the parity shards 410 may be indexed as corresponding to one or more of the original data shards 406. For example, the parity shards "PA" and "PB" may be indexed as corresponding to the original data shard "DA". According to the systematic redundancy encoding scheme described herein, the parity shards "PA" and "PB" could therefore be used to reconstruct original data of the original shard "DA". The index may be a single index or may be a multipart index, and may be of any appropriate architecture and may be generated according to any appropriate method. For example, the index may be a bitmap index, dense index, sparse index, or a reverse index. Embodiments where multiple indices are used may also implement different types of indices according to the properties of the original data shard (or "identity shard") to be stored via the data processing system described herein. For example, a data processing system may generate a dense index for archives over a specified size (as the size of the index itself may be small relative to the number of archives stored on a given volume), and may also generate a sparse index for archives under that specified size (as the ratio of index size to archive size increases).

The encoded information may be any mathematically computed information derived from the original data, and depends on the specific redundancy code applied. As mentioned herein, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code implements a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indices) are allowed to pass straight through. In such embodiments, the volumes bearing the original data (and the indices) may also correspond to objects encoded from that original data by the identity matrix rows of the generator matrix of the applied redundancy code, while volumes bearing derived data correspond to other rows of the generator matrix.

In the example illustrated in FIG. 4, storage nodes 408 include at least eight volumes that have original data shards 406 (e.g., identity shards) corresponding to the original data of the original data, while four storage nodes 412 have encoded shards 410 corresponding to the derived or parity data (also referred to herein as "derived shards"). The encoded or parity shards 410 may be generated using one or more augmented data shards, as described herein. One or more data shards 408 may be stored on each storage node. The processing service may index the storage nodes storing the data shards 408 as having data corresponding to the data 402 processed. For instance, the data may be indexed according to an identifier associated with the requesting entity, or an identifier associated with the particular data. The data shards 406 may be stored according to an appropriate allocation. A number of storage nodes may be identified prior to storage of the data shards 406. In one embodiment, the original data shards 406 may be stored according to a "round robin" allocation such that an augmented data shard is sequentially stored on each of the eight storage nodes 408 depicted before a second data shard is stored again on the first storage node (i.e., the storage node storing data shard "DA"). In one embodiment, a predetermined number of augmented data shards may be stored on a storage node 408 before beginning to store augmented data shards on the next storage node.

As illustrated in FIG. 4, the eight original storage nodes 408, and the four parity shards 410 corresponding to the derived data form the bundle 404. The bundle 404 is a 12:8 bundle having a ratio or "stretch factor" of 1.5, because for a volume of data of the bundle 404, 1.5 volumes are required. In a 12:8 bundle, eight volumes are used for data and four for parity. So, for example, using 1 MB (megabyte) volumes, a 12:8 bundle can store 8 MB of data (eight data volumes) on eight 1 MB volumes (i.e., 8 MB total), resulting in the 1.5 stretch factor (12 divided by 8). In another example, with a 4:3 bundle (3 data shards with 1 parity shard), the stretch factor is 1.33.

Using such encoding techniques allows the storage of original data and redundant storage in storage nodes 408, while providing ways to recover from extensive loss of many storage devices and even the recovery of data after the loss of entire data storage facilities. In particular, the data 402 may be processed and stored as a data bundle 404 comprising the plurality of data shards 406 and a plurality of parity shards 410. The parity shards 410 are shards derived using a redundancy encoding scheme or parity encoding. Data originally encoded into the data shards 406 may become unavailable on the storage nodes 408 for various reasons. In the event of unavailable data, the originally coded data may be reconstructed using one or more of the parity shards 410. As used herein, the parity shard 410 may be configured to store the "exclusive or" (denoted "XOR" or "⊕") of the data stored in the other (e.g., data and/or derived) shards.

In an illustrative example, a first simple sixteen-bit data shard may contain "0010 1011 0110 1011" and a second simple sixteen-bit data shard may contain "0100 1101 0100 1011." The XOR of these two simple sixteen-bit data shards is "0110 0110 0010 0000" and this XOR value (e.g., the value obtained from XORing the two simple sixteen-bit data shards) may then be stored in a parity shard 410. As described herein, a parity encoding is a linear redundancy encoding scheme based on XOR operations. With two data shards and a parity shard, one of the three values may be lost, and the lost value can be reconstructed from the XOR of the remaining two values. For example, if the first data shard is designated "A," the second data shard is designated "B," and the parity shard is designated "C," then A⊕B=C, A⊕C=B, and B⊕C=A (i.e., any of the shards can be reconstructed from the other two). Storing the "exclusive or" of the data shards ensures that even parity is maintained over the three shards because, if A⊕B=C, then A⊕B⊕C=0. Single parity shards may also be used with larger quantities of data shards to the same effect, allowing the reconstruction of any single lost data value. An additional property of a shard is that a portion of a shard can be reconstructed from corresponding portions of the other shard. In the illustrative example above, each of the four-bit groups of data in the sixteen bit parity shard may be interpreted as a four-bit parity shard for the corresponding four-bit values in data shard "A" and data shard "B."

Several redundancy encoding techniques may be used or, in some embodiments, more complex redundancy encoding techniques are used. In a more complex example, four data shards may be combined with two corresponding derived shards (for a total of six shards in the collection of shards) to allow the reconstruction of up to two lost shards (also referred to herein as "damaged shards") where the lost shards may be data shards, they may be derived shards, or they may be one of each. In one embodiment, the redundancy encoding scheme is a systematic erasure coding scheme, such as Reed-Solomon Coding. Reconstruction of shards in such an example may be accomplished using other redundancy codes in some embodiments such as, an online code, a Luby transform code, a Cauchy Reed-Solomon code, a regenerating code, a maximum distance separable code, a repetition code, a cyclic code, a Hamming code, a Reed-Muller code, a Goppa code, a BCH code, a Golay code, an expander code, a linear block code, a linear erasure code, and/or some other redundancy code.

Figure 5:
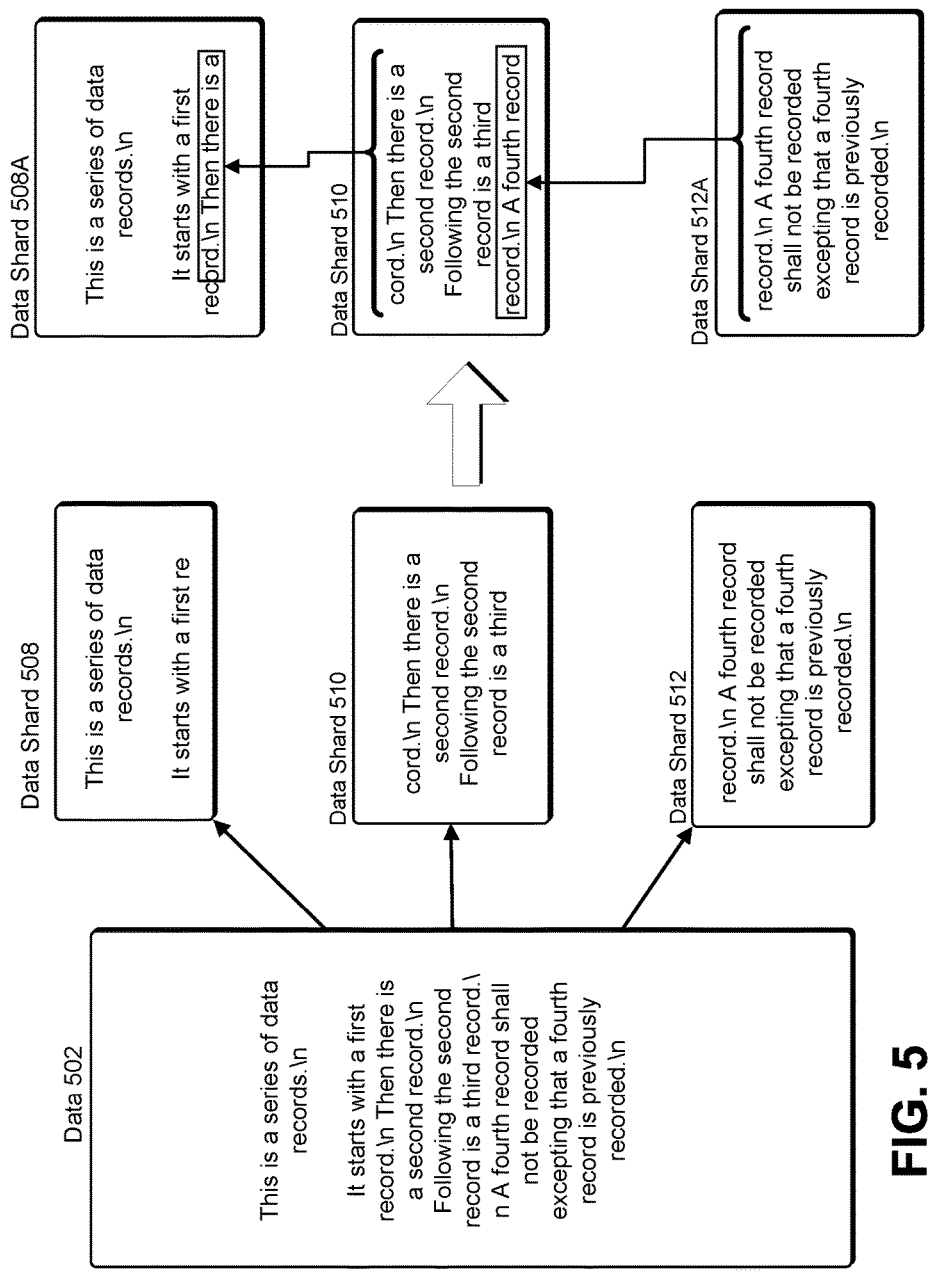
FIG. 5 shows an illustrative example of an encoding technique according to various embodiments.

FIG. 5 is an illustrative example of an approach for encoding data 502. The data 502 in this illustrative example is a small portion of text. Those of skill in the art will appreciate that the principles described with respect to this example are applicable to other types of data including, but not limited to, media files, log files, compressed files, etc. A data processing service may sequentially encode data 502 received into a plurality of data shards, each of the data shards having a same size. The data 502 comprises a plurality of records that each end at a newline character '\n'. For example, the data 502 comprises a first record, "This is a series of data records.\n It starts with a first re"; a second record, "cord.\n Then there is a second record.\n Following the second record is a third"; and a third record "record.\n A fourth record shall not be recorded excepting that a fourth record is previously recorded.\n". Because each shard has a predetermined size, the amount of the data 502 that can be encoded into a shard. In particular, the data processing service 504 generates a first shard 508 comprising the first record and the first portion of the second record ("This is a series of data records.\n it starts with a first re"). The second data shard 510 comprises a second portion of the second record ("cord.\n Then there is a second record.\n Following the second record is a third"), and the third portion of the second record is stored on a third data shard and so on. The second record is therefore divided among the first shard 508, the second shard 510, and a third shard 512. Data shards are generated from the data 502 until every record in the data 502 has been encoded.

One result of this approach is that records, such as the second record ("cord.\n then there is a second record.\n following the second record is a third"), are broken and divided among separate shards. Searching for a record that is broken or divided requires coordination between storage nodes storing the shards, or a computing entity managing the storage nodes, to determine which node the record is located on. For instance, if a user searches for a record containing the search text "first record", the data storage devices storing the first data shard 508 and the second data shard 510 will have to coordinate with each other to determine that the second record contains the search text. This is at least because the search text is broken or divided among two or more shards such that the first shard 508 contains the first part of the search text, "first re", and the second shard 510 contains the second part of the search text, "cord". One of the storage devices will have to communicate with the other that it has a portion of the search text and that the record portions are contiguous. This process increases latency and the processing cycles required to locate the search text. Alternatively, a management computing entity could retrieve the data shards and parse through the data encoded in contiguous shards to locate the search text. The management computing entity must query the storage devices to retrieve the data encoded on each data shard, wait until the requested data is returned, and then piece together the divided data pieces to find the search text.

According to the methods and systems described herein, the data shards may be processed (e.g., by the data processing service) to append or concatenate an initial portion of a data shard to an end of the preceding data shard. The initial portion of the second shard 510 ("cord.\n Then there is a") may be appended to the end of the first shard 510. The size of the initial portion appended to the end of the previous shard may correspond to a maximum record length that will not be exceeded in the received data. That is, the portion appended to the previous shard will be large enough to ensure that a record delimiter will be appended to the end of the last record in the preceding shard thereby completing the record. By writing or encoding data to shards in this way, a system searching for a data record contained in the shards will be entirely located on a single shard without having to search adjacent shards. Accordingly, each shard can be tasked with searching the data records contained thereon without coordinating with other shards to stitch together broken or divided records. As discussed below with respect to FIG. 9, each shard or storage node tasked with searching for a data record may search only to the last record delimiter before determining whether a record is contained or stored in the shard or node. Any additional records past the last record delimiter may be ignored. Conversely, shards or nodes searching shards stored thereon may begin searching for a record after the first record delimiter, with the exception of the first shard, which is tasked with searching records until the last record delimiter.

Figure 6:
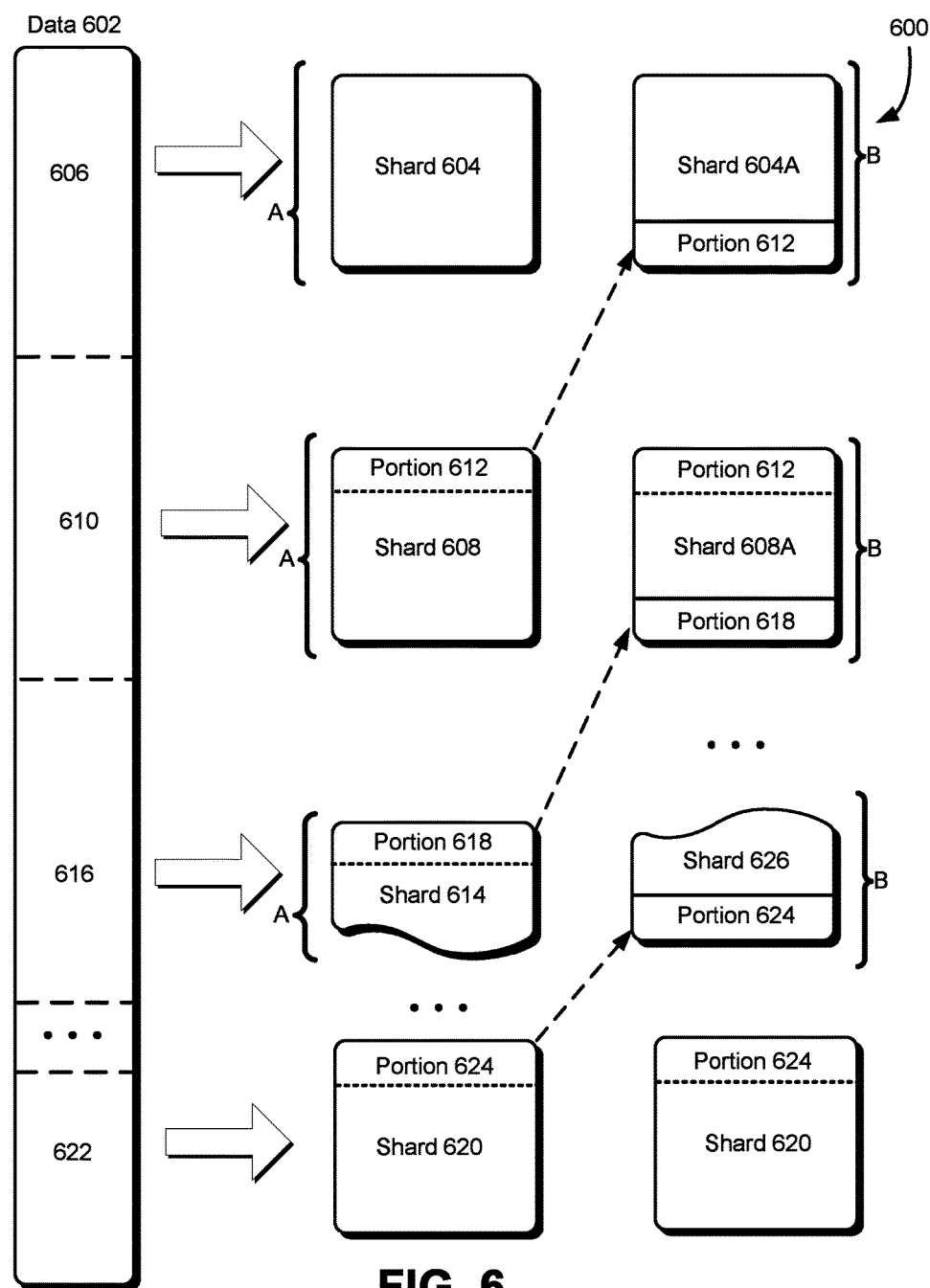
FIG. 6; shows an illustrative example of data record storage according to various embodiments.

FIG. 6 is an illustrative example of an environment 600 in which data is encoded to generate data shards according to various embodiments of the present disclosure. A data processing service, as described above, may generate a plurality of data shards using data 602 received in association with a request to store data. As also described above, the processing service may sequentially generate the plurality of shards in correspondence with sequential portions of the data 602. The data 602 may be a contiguous volume of data comprised of sequential data bits. The data shards generated may be stored in memory accessible by the processing service during generation of the data shards. The processing service may begin generating a first data shard 604 from a first portion 606 of the data 602. The first portion 606 may be a portion at the beginning of the data 602, and may include information such as header data. The processing service may obtain sequential pieces of the first portion 606 and accumulate the pieces in the first shard 604 until the first shard 604 reaches a predetermined size A. The predetermined size A may be on the order of megabytes, such as one to two megabytes, for example. Obtaining the pieces of the first portion 606 may be in accordance with the method in which the data 602 is provided; for example, obtained stream of data or obtained from a data object. Obtaining the pieces may also include encoding the pieces using an encoding scheme, as described herein. In one embodiment, the processing service may accumulate the pieces of the first portion 606 into memory until the first shard 604 reaches the predetermined size A.

After generating the first shard 604, the processing service may generate a second data shard 608 having the predetermined size A from a second portion 610 of the data 602. The second portion 610 is a portion of the data 602 subsequent to the first portion 606. The second portion 610 may include an initial portion 612 that corresponds to a portion of the second portion 610 adjacent to an end of the first portion 606. The size of the initial portion 612 is a predetermined size smaller than the predetermined size A—for example, the size of the initial portion 612 may be on the order of kilobytes (e.g., 4 kB). The processing service may append or concatenate the initial portion 612 to the end of the first shard 604 to generate an augmented first shard 604A having a size B. The size B of the augmented shard 604A is equal to the size A of the first shard 604 plus the size of the initial portion 612. In one embodiment, the initial portion 612 may be appended to the first portion 604 after the initial portion 612 reaches its predetermined size, at which point the processing service causes the initial portion 612 to be duplicated for appending to the first data shard 604. In one embodiment, the processing service may append the initial portion 612 to the first shard 604 after the second shard 608 reaches the predetermined size B. After the augmented shard 604A is generated, the processing service may initiate a storage operation to store the augmented shard 604A on a corresponding storage node.

After the second shard 608 is generated, the processing service may generate subsequent data shards in the same manner as the first augmented shard 604A and the second shard 608 described above. Specifically, a third shard 614 corresponding to the third portion 616 of the data 602 is generated from a third portion 616 of the data 602. An initial portion 618 of the third shard 614, having the same size as the initial portion 612 of the second shard 608, is duplicated and appended to the end of the second shard 608 to generate an augmented second shard 608A. The augmented second shard 608A has the predetermined size B corresponding to the size A plus the size of the initial portion 618. The processing service may then initiate a storage operation to store the second augmented shard 608A on a corresponding storage node.

Successive augmented data shards may be successively generated in this manner until all of the data 602 is encoded. The processing service generates a last data shard 620 from an end portion 622 of the data 602 and appends an initial portion 624 of the last data shard 620 to the end of the preceding penultimate data shard 626. In some cases, there may not be sufficient data in the end portion 622 of the data 602 to generate a data shard having the predetermined size A. Accordingly, the last shard 620 may have a size less than the predetermined size A. Alternatively, the processing service may pad or populate the last shard 620 with null values or zero values to generate the last shard having the predetermined size A. The last shard 620 is then stored on a corresponding storage node. As discussed above with respect to FIGS. 1 and 4, and FIG. 9 below, each of the storage nodes storing the augmented shards and the last shard may be tasked with individually searching or filtering the records contained thereon without coordinating between shards to complete broken or divided records.

In one embodiment, one or more of the augmented data shards may be generated by generating a shard having the predetermined size B wherein an initial portion of the shard is comprised of original data and the end portion is reserved for appending the initial portion of the next shard. For example, when first generated, the augmented shard 604A may have a first portion of the predetermined size A comprising original data and a second portion that is reserved for appending the initial portion of the second shard 608. The second portion may have a size equal to the predetermined size B minus the predetermined size A. The reserved second portion may be an area or section of memory, adjacent in memory to the first portion, that is reserved for writing the initial portion of the second shard 608 such that the processing service will not allow the memory to be accessed or modified until the initial portion has been copied or written to the second portion. One or more of the successively generated augmented shards (except for the last) may be generated in a similar manner.

Figure 7:
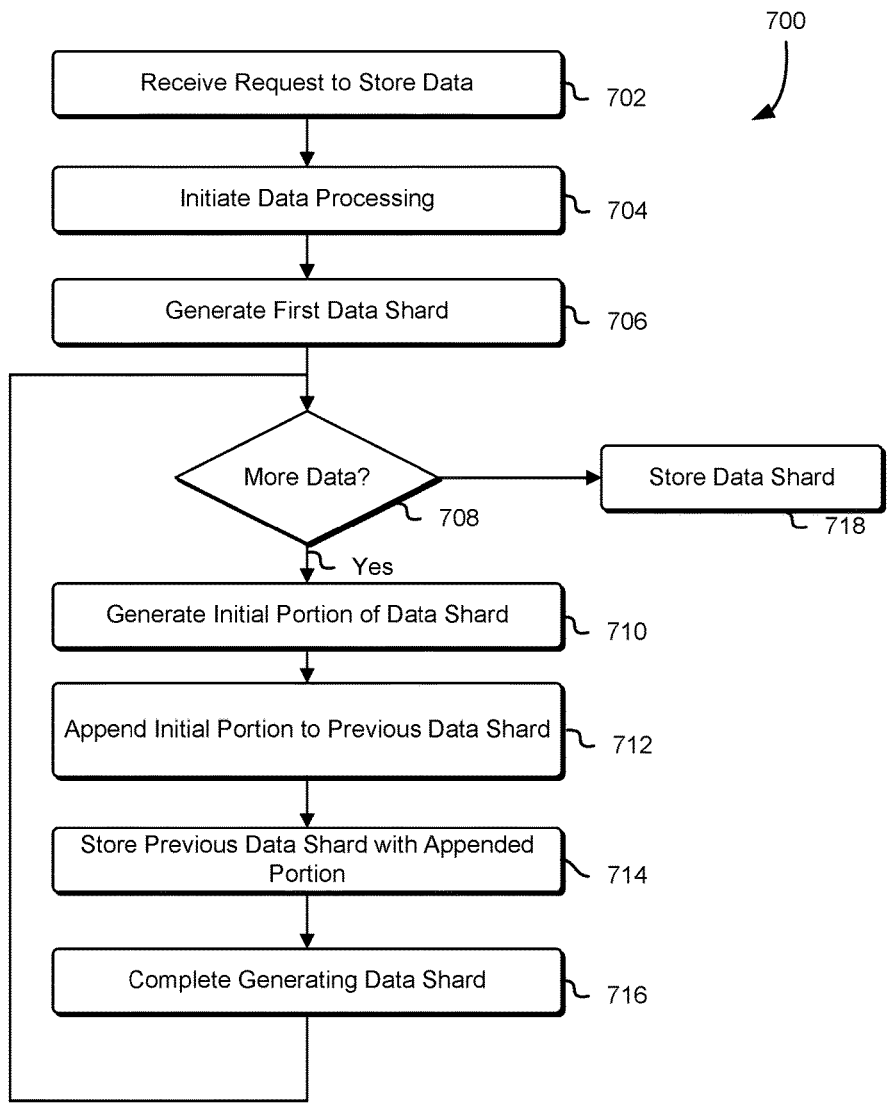
FIG. 7 shows an illustrative example of a process for storing data according to various embodiments.

FIG. 7 is an illustrative example of a process 700 for generating augmented storage blocks according to various embodiments described herein. The process 700 may be performed by a data processing service, as described above. The processing service may receive 702 a request from a requestor to store the data. The request may specify the data to be stored, and may include one or more parameters, such as a size of the initial portion of the data shard to be appended to the preceding data shard, as described above with respect to FIGS. 5 and 6. The processing service may then initiate 704 processing of the data received in association with the request—for example, by ingesting a data stream or data object obtained or provided. The processing service may generate 706 a first data shard having a predetermined size, which may be specified in the request or may be specified by a set of system parameters.

After generating the first data shard, as described above with respect to FIGS. 5 and 6, the processing service may determine whether there is additional data 708 to be stored or encoded into data shards. If so, the processing service generates 710 an initial portion of a next data shard. The initial portion may have a predetermined size specified by the request to store data, or may be specified by other parameters, such as parameters associated with the requestor or data type. The initial portion is then appended 714 or concatenated to the end of the previous data shard—namely, the first data shard in this instance. Thereafter, the previous data shard with the appended initial portion (referred to as an "augmented data shard" above) is stored 714 in a storage node. The processing service may then complete generating 716 the current data shard. The processing service returns to step 708 to determine whether there is additional data and, if so, repeats the steps 710 through 716. If there is no additional data, the processing service stores 718 the data shard in a storage node.

Figure 8:
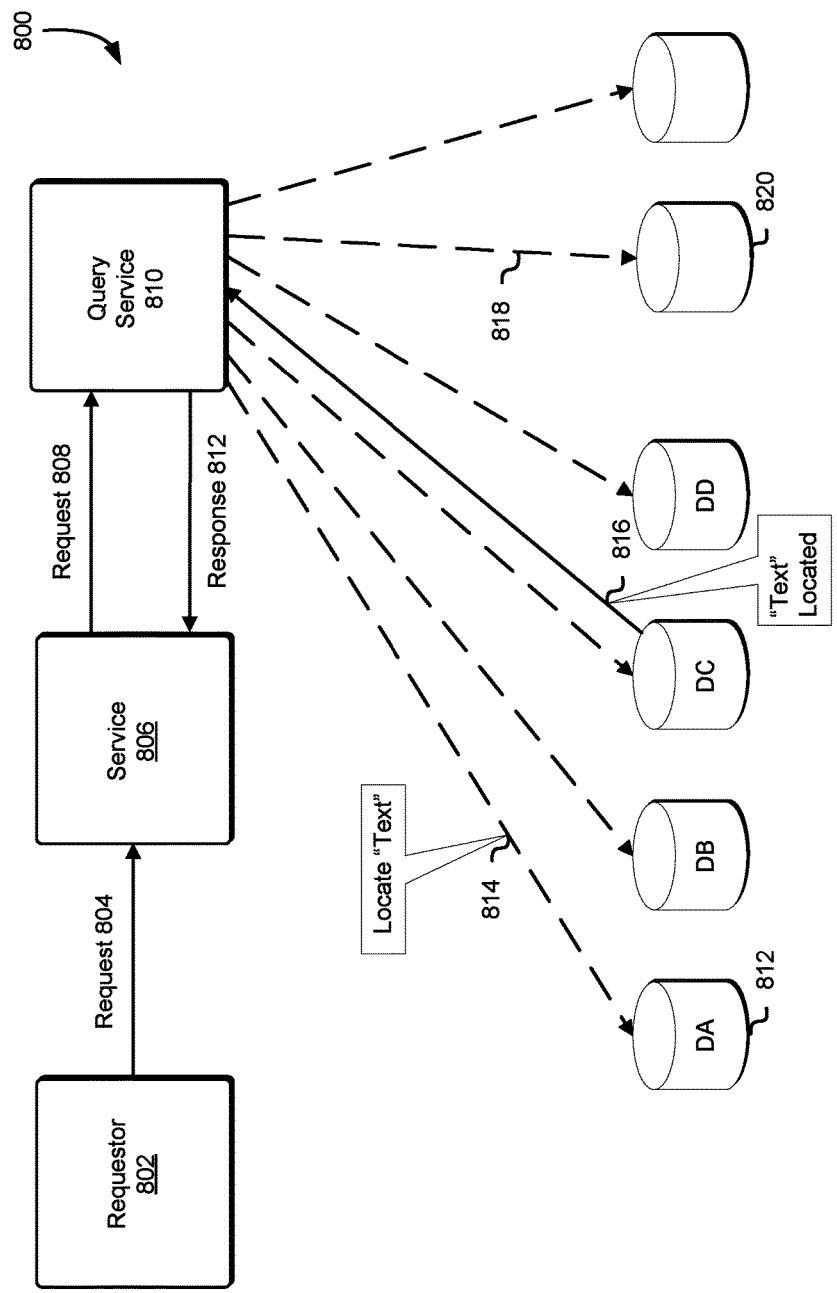
FIG. 8 shows an illustrative example of an environment for fulfilling a data retrieval request according to various embodiments.

FIG. 8 is an illustrative example of an environment 800 for retrieving data from data shards generated as described above. A requestor 802 may transmit a request 804 to a service 806 of a service provider requesting to retrieve or find data. The request 804 may specify the data to be retrieved using one or more search criteria, such as by specifying an identifier associated with the data or requestor, or by specifying the data contained in one or more data records in the shard. In one example, the request 804 may specify a string of characters in the data to be retrieved. In one embodiment, the service 806 is a data storage and/or processing service, as described above. The service 806 may transmit a request 808 to a query service 810 to find the queried data. The query service 810 is configured to contact storage nodes 812 and to request filtered results from the data shards present on each storage node 812. In one embodiment, the storage nodes 812 are nodes local to the query service 810—for example, nodes 812 located in the same geographic location or same datacenter as the query service 810. The query service 810 may be configured to know which of the storage nodes are available or active to retrieve or obtain requested data. If one or more of storage nodes 812 is unavailable, the query service 810 (or the processing service) may initiate a data reconstruction process to reconstruct the data on the unavailable storage node.

The query service 810 may send requests 814 to each of the storage nodes 812 to locate the data requested by the requestor 802. Each of the storage nodes 812 may then search the data shards stored thereon to search through or filter data to find the requested data. Each of the storage nodes 812 is configured to independently search for content stored in data shards located on or associated with the respective storage node 812 without coordinating with other storage nodes. For instance, the query service 810 may submit a request 812 requesting that the storage nodes 812 locate or filter content having the string of characters to be retrieved—in this example, the content "Text". One or more of the storage nodes 812 may then look for the content "Text" in parallel and return an indication of whether the content was located or filtered. Each data shard may search or filter the data records in a manner described above with respect to FIG. 6.

The storage nodes 812 may provide an indication of whether the requested data matches data filtered or found in the data shards. In one embodiment illustrated in FIG. 8, the storage node "DC" sends a response 816 indicating that the content "Text" was located or filtered on a data shard stored thereon. The storage node "DC" may then return the filtered data to the query service 810, provide a positive indication that the content was located, or wait for further instructions from the query service 810 regarding how to proceed. In one embodiment, if one of the storage nodes 812 is too busy to complete the query, the storage node 812 may return one or more unfiltered data shards to the query node 810. If the query node 810 receives an indication from the storage nodes 812 that the requested data is contained in a data shard stored on one or more of the storage nodes, the query node 810 may provide a response 812 to the service 806, or alternatively to the requestor 802, providing access to the requested data.

The query node 810 may also be configured to utilize parity shards stored on one or more storage nodes 814 to recover data unavailable on the storage nodes 812. The parity shards correspond to the parity shards 310 discussed above with respect to FIG. 3. For instance, if the query service 810 fails to receive a response from the storage nodes 812 indicating a positive indication for the queried data, the query service 810 may initiate a data recovery operation. The query service 810 may send a request 818 to one or more of the storage nodes 820 to provide parity shards or parity information contained thereon. Using the parity information from the parity shards, the query service 810 may involve one or more of the parity shards stored on the storage nodes 820. The query node 810 may process the data from the parity shards, reconstruct the unavailable requested data using the systematic redundancy encoding (e.g., Reed-Salomon) and provide the requested data to the requestor 802. The query service 810 may also store the reconstructed data in the storage nodes 812 for future use.

Figure 9:
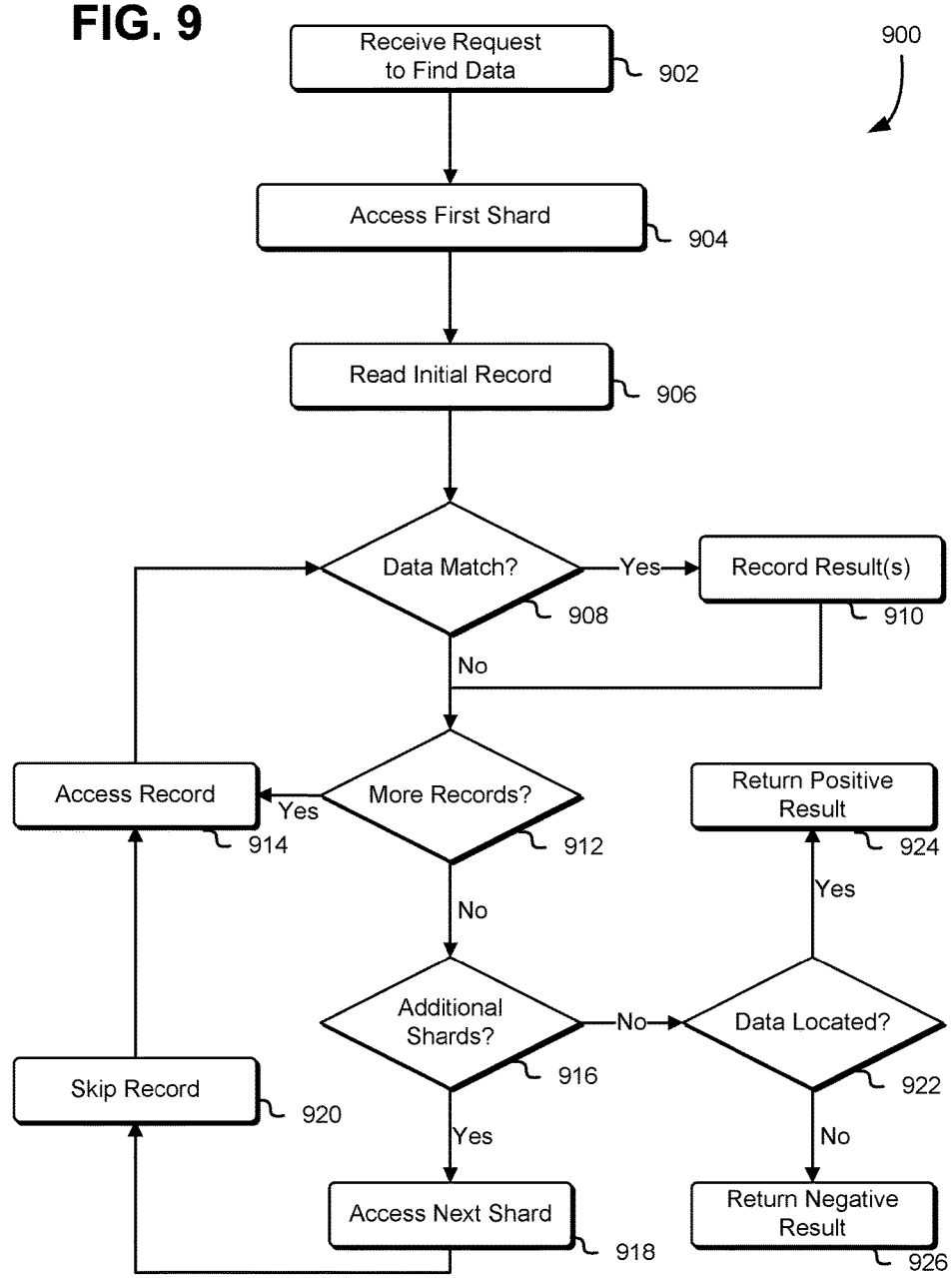
FIG. 9 shows an illustrative example of a process for locating requested data.

FIG. 9 illustrates aspects of a process 900 for locating or filtering a data shard in accordance with various embodiments presented herein. The process may be performed by a storage node storing one or more augmented data shards generated from data received in association with a request to store data, as described above. The storage node may first receive 902 a request to find data on one or more shards. The request may specify the data to be located. For instance, the data to be located may be a sequence of characters, such as the characters included in the data described above with respect to FIG. 5. The data to be located may be a file name or text included in a file. The request may specify one or more other parameters, such as a data type (e.g., mpeg video data, mp3 audio data, document data), date of creation or modification, author, or other appropriate parameters. The parameters may be independent of the data specified to be located or may be specified as parameters to be searched for in conjunction with the data to be located, and which may be specified in Boolean format (e.g., "filename" AND "filetype: mpeg").

The storage node may next access 904 a data shard in the storage node. The shard accessed may be the shard located at or near the beginning of an initial data region, or may be a shard accessed at a memory location associated with a request to access data, such as an identity of the requestor or an identifier of the data requested. Next, the storage node may read or parse an initial record 906 from the shard. The data record read corresponds to the data read from the shard up to the first record delimiter. The storage node may then determine 908 whether the data read matches the data queried or requested in the request. If so, the storage node may record 910 that a record matches the data requested. The indication may include the data itself or a reference to a memory location containing the data requested and/or setting a flag indicating that a positive result should be returned to the querying service. The storage node may then proceed to determine 912 whether there are any additional records to be searched.

If the data read does not match the data requested, the storage node may determine 912 if there is an additional complete or entire record located in the shard. This may be performed by searching for the next record delimiter, which would indicate that an additional complete record is located in the data shard. If there is an additional complete record in the shard, the storage node may access 914 the record and determine 908 whether there is a data match. If there are no more records in the shard, the storage node may determine 916 whether there is an additional shard to be searched in the storage node. If not, the storage node may determine 918 whether the requested data was located. The negative result may, alternatively, be the absence of a result returned. If the storage node determines that there is an additional shard to be searched or queried, the storage node accesses 918 the next shard in the storage node. Because the next shard is not the initial shard in the node, the storage node may skip 920 the first record in the shard. This is because the previous shard "owns" or is responsible for maintaining the entire last record, so the storage node may disregard the first record up to and including the first record delimiter. Thereafter, the storage node may access the next record 914 and determine 908 whether the record matches the requested data, as described above.

If no additional shards are found in step 916, the storage node may determine 922 whether the requested data was located. If the requested data was found, the storage node may return 924 the one or more positive results to the querying service. This may be accomplished by providing a positive indication of the found results, or by providing the actual content corresponding to the data requested. If, after searching the data shards, the storage node determines 922 that the requested data was not located, the storage node may return 926 a negative result to the querying node. If the requested data is not found in any of the storage nodes, or the data located does not match the requested data, the querying node may perform a data recovery process using the parity shards, as described herein.

Figure 10:
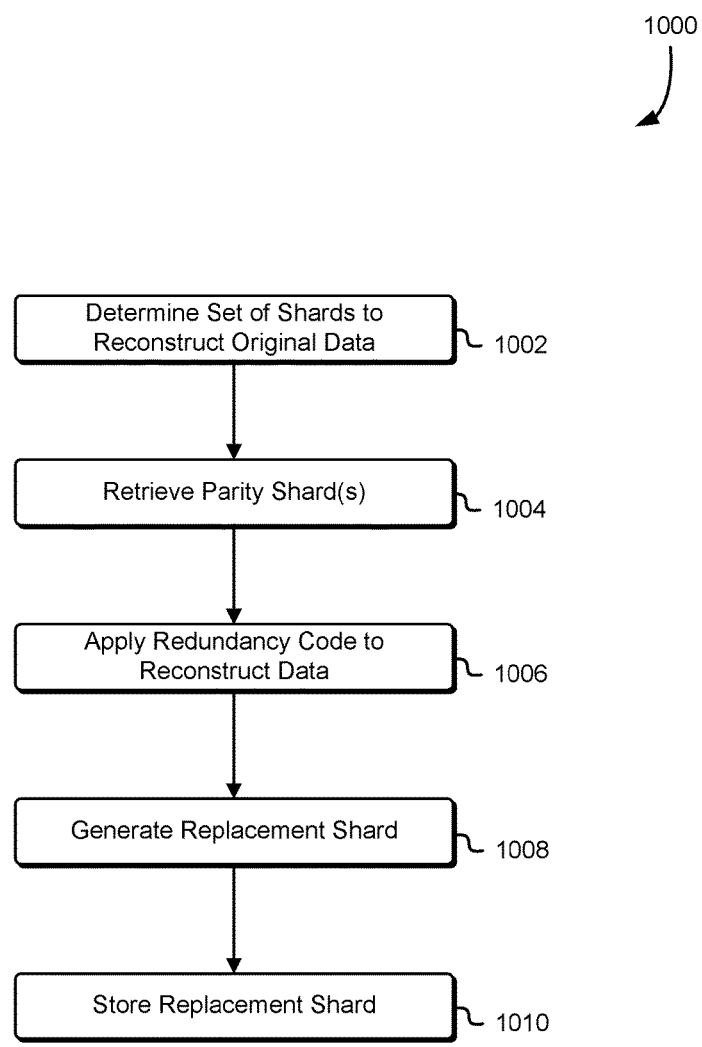

FIG. 10 illustrates aspects of a process 1000 for reconstructing data that was requested but determined to be unavailable as a result of the process 900. The process 1000 may be for applying redundancy encoding techniques to data for durable storage as described herein in connection with FIGS. 4, 8, and 9 and in accordance with one or more embodiments. The example process 1000 illustrated in FIG. 10 may be performed by one or more entities described herein, such as by a data processing service or a query node. The processing service (or query service) may determine 1002 a set of parity shards from which the original data may be reconstructed. The set of parity shards may be determined or identified using the indexing prepared as described above with respect to FIG. 4. The processing service may then obtain 1004 the set of parity shards to be used to reconstruct the data determined to be unavailable. After obtaining the set of shards, the processing service may apply 1006 the systematic redundancy code to reconstruct the unavailable data. For example, according to at least one systematic redundancy code, an exclusive OR operation (i.e. "XOR") may be applied to the set of parity shards obtained to reconstruct the unavailable data. Once the data is reconstructed, the reconstructed data may be used to generate 1008 a replacement shard if the original data was determined to be lost or corrupted. The replacement shard may then be stored 1010 as an original data shard of the set original data shards (e.g., the original data shards 406) in an appropriate storage node. The storage node may then filter or search the original data stored in the reconstructed data shard to determine whether the requested data is located therein, as provided in the process 900 discussed above.

Figure 11:
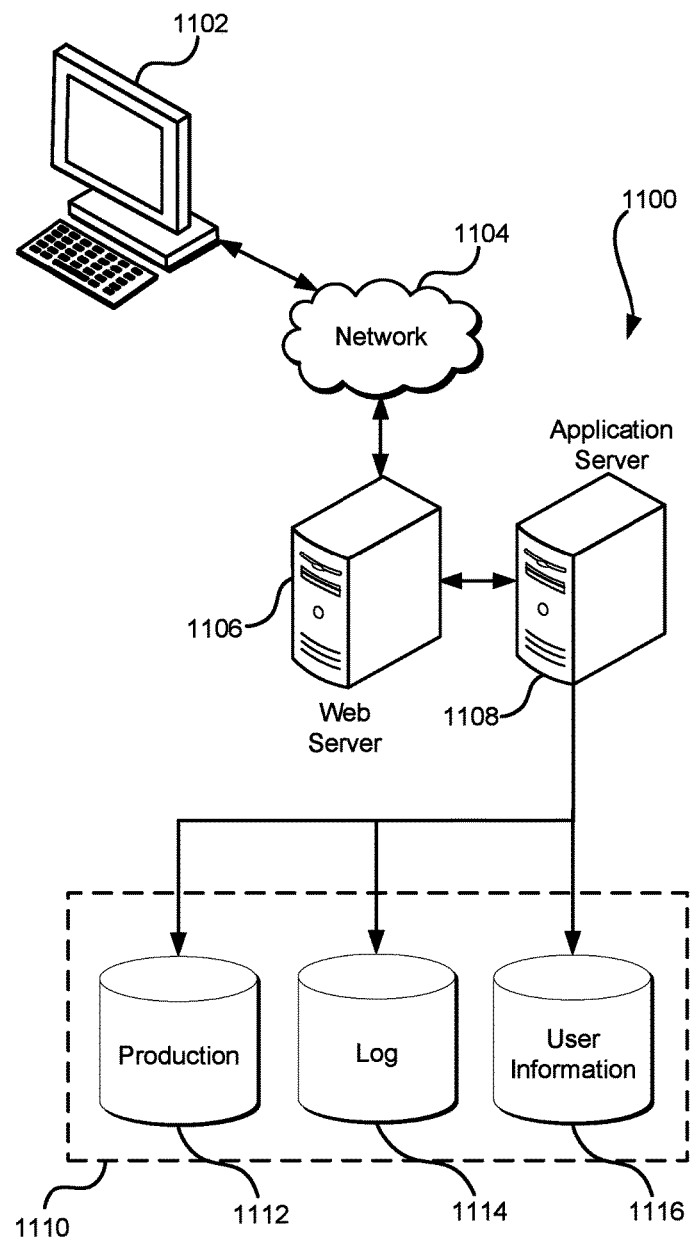
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage nodes and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CS S"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The invention claimed is:

1. A computer-implemented method, comprising:
    processing a stream of data to generate a first data block and a second data block, an end portion of the first data block comprising an initial portion of the second data block;
    storing the first data block in data storage;
    receiving a request to retrieve a record received on the stream of data, a start of the record being located sequentially before an end of the first data block; and
    processing the request at least by retrieving the record from the first data block using at least some of the end portion of the first data block.

2. The computer-implemented method of claim 1, wherein the first data block and the second data block are data shards generated according to a redundancy encoding scheme.

3. The computer-implemented method of claim 1, further comprising:
    appending the initial portion of the second data block to the end portion of the first data block to generate an appended first data block.

4. The computer-implemented method of claim 3, wherein the appended first data block and an appended second data block are each stored as a contiguous volume in one or more of a plurality of storage nodes.

5. A system, comprising:
    one or more processors;
    memory that stores computer-executable instructions that, upon execution, cause the one or more processors to:
        process a stream of data to generate a first data block and a second data block, an end portion of the first data block comprising an initial portion of the second data block;
        store the first data block in data storage;

receive a request to retrieve a record received on the stream of data, a start of the record being located sequentially before an end of the first data block; and process the request at least by retrieving the record from the first data block using at least some of the end portion of the first data block.

6. The system of claim 5, wherein the first data block corresponds to a first storage node of one or more data storage nodes, and the second data block corresponds to a second node of the one or more data storage nodes.

7. The system of claim 6, wherein the first data block and the second data block each comprise a predetermined amount of the stream of data.

8. The system of claim 7, wherein generating the first data block includes reserving a section of the first data block corresponding to the predetermined amount of the stream of data, and the initial portion of the second data block is appended at the section.

9. The system of claim 5, wherein the computer-executable instructions, upon execution, further cause the one or more processors to:

generate, after generating the second data block, a third data block from a third portion of the data sequential to the second data block;

append a portion of the third data block to the second data block to generate an appended second data block; and store the appended second data block on one or more data storage nodes.

10. The system of claim 9, wherein the computer-executable instructions, upon execution, further cause the one or more processors to:

append the initial portion of the second data block to the first data block to generate the appended first data block.

11. The system of claim 10, wherein the computer-executable instructions, upon execution, further cause the one or more processors to generate a data chunk having a predetermined size, the data chunk comprising a plurality of data blocks, wherein the appended first data block and the appended second data block are equal sized data blocks of the data chunk.

12. The system of claim 9, wherein the initial portion of the second data block is a same predetermined size as the portion of the third data block.

13. A non-transitory computer-readable storage medium having stored thereon executable instructions that, as a result of being executed by one or more processors of a computer system, cause the computer system to at least:

process a stream of data to generate a first data block and a second data block, an end portion of the first data block comprising an initial portion of the second data block;

store the first data block in data storage;

receive a request to retrieve a record received on the stream of data, a start of the record being located sequentially before an end of the first data block; and process the request at least by retrieving the record from the first data block using at least some of the end portion of the first data block.

14. The non-transitory computer-readable storage medium of claim 13, wherein the instructions further comprise instructions that, as a result of being executed by the one or more processors, cause the computer system to:

store the first data block on a first storage node of the one or more storage nodes; and store the second data block on a second storage node of one or more storage nodes different than the first storage node, wherein the second data block comprises an initial portion of a third data block generated sequentially after the second data block.

15. The non-transitory computer-readable storage medium of claim 13, wherein the first data block and the second data block are original data blocks generated according to a redundancy erasure encoding scheme.

16. The non-transitory computer-readable storage medium of claim 15, wherein the instructions further comprise instructions that, as a result of being executed by the one or more processors, cause the computer system to retrieve data content from one or more encoded data blocks.

17. The non-transitory computer-readable storage medium of claim 13, wherein processing the request includes locating one or more record delimiters in the first data block.

18. The non-transitory computer-readable storage medium of claim 13, wherein individual records of the first data block have a predetermined length.

19. The non-transitory computer-readable storage medium of claim 13, wherein a pair of adjacent records in the first data block are separated by a delimiter.

20. The non-transitory computer-readable storage medium of claim 13, wherein the instructions further comprise instructions that, as a result of being executed by the one or more processors, cause the computer system to accumulate the stream of data into a data bundle comprising a plurality of data blocks each having a predetermined size, the plurality of data blocks including the first data block and the second data block.

* * * * *